(12) United States Patent
Wisse et al.

(10) Patent No.: US 8,152,144 B2
(45) Date of Patent: Apr. 10, 2012

(54) APPARATUS FOR EXERCISING A FORCE ON A LOAD

(75) Inventors: Boudewijn Martin Wisse, Delft (NL); Rogier Barents, The Hague (NL); Wouter Dirk Van Dorsser, Delft (NL); Justus Laurens Herder, The Hague (NL)

(73) Assignee: Anchis Technology B.V., Maastricht (NL)

( * ) Notice: Subject to any disclaimer, the term of this patent is extended or adjusted under 35 U.S.C. 154(b) by 12 days.

(21) Appl. No.: 12/819,845

(22) Filed: Jun. 21, 2010

(65) Prior Publication Data

US 2010/0320430 A1  Dec. 23, 2010

Related U.S. Application Data

(63) Continuation of application No. PCT/NL2008/050802, filed on Dec. 16, 2008.

(30) Foreign Application Priority Data

Dec. 21, 2007 (NL) .................................. 2001125

(51) Int. Cl.
 F16M 1/00 (2006.01)
(52) U.S. Cl. ........................................ 267/136; 267/166
(58) Field of Classification Search .................. 267/136, 267/141, 141.2, 155, 166; 248/351, 560, 248/564
See application file for complete search history.

(56) References Cited

U.S. PATENT DOCUMENTS

| 3,116,910 A | 1/1964 | Moore |
| 4,760,622 A | 8/1988 | Rohrman |
| 4,883,249 A | 11/1989 | Garland |
| 6,805,337 B1 * | 10/2004 | Rastegar et al. ............... 267/136 |
| 2005/0145762 A1 | 7/2005 | Sweere et al. |
| 2008/0210842 A1 | 9/2008 | Van Dorsser et al. |

FOREIGN PATENT DOCUMENTS

| DE | 3406669 | 8/1985 |
| GB | 489547 | 7/1938 |
| GB | 997620 | 7/1965 |
| GB | 2193744 | 2/1988 |
| JP | 2003070582 | 3/2003 |
| JP | 2003189961 | 7/2003 |
| NL | 6803842 | 9/1968 |
| NL | 1029989 | 8/2006 |
| WO | WO 2007035096 | 3/2007 |

* cited by examiner

*Primary Examiner* — Pamela Rodriguez
(74) *Attorney, Agent, or Firm* — Jeffrey D. Meyers; Peacock Myers, P.C.

(57) ABSTRACT

An apparatus for exerting a force on a load, comprising at least a first spring system and a second spring system, which two spring systems are coupled with the load and produce forces that are applied to the load, wherein an adjusting device is provided coupled with the load, which is equipped with at least one coupling with which the first spring system and/or the second spring system are/is coupled, and which adjusting device is designed for moving the coupling subject to an adjustment of the load, wherein the first spring system has a linear spring characteristic and is coupled with the load, and wherein the second spring system is coupled with the coupling at a side of the coupling removed from the load, and wherein the coupling is designed for adjusting the second spring system subject to a predetermined spring characteristic of the second spring system such that, at the side of the load, the combination of the coupling with the second spring system possesses a force path diagram having a linear characteristic.

5 Claims, 2 Drawing Sheets

APPARATUS FOR EXERCISING A FORCE ON A LOAD

CROSS-REFERENCE TO RELATED APPLICATIONS

This application is a continuation application of International Patent Application Serial No. PCT/NL2008/050802, entitled "Apparatus for Exercising a Force on a Load", to Technische Universiteit Delft and InteSpring Holding B.V., filed on Dec. 16, 2008, which is a continuation of Netherlands Patent Application Serial No. 2001125, entitled "Apparatus for Exercising a Force on a Load", to Technische Universiteit Delft and InteSpring Holding B.V., filed on Dec. 21, 2007, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to an apparatus for exerting a force on a load, comprising at least a first spring system and a second spring system, which two spring systems are coupled with the load and produce forces that are applied to the load, wherein an adjusting device is provided coupled with the load, which is equipped with at least one coupling with which the first spring system and/or the second spring system are/is coupled, and which adjusting device is designed for moving the coupling subject to an adjustment of the load.

2. Description of Related Art

Such an apparatus is known from the German patent application DE-A-34 06 669.

Such an apparatus is also known from the British patent specification GB-A-489 547. The apparatus known from the British patent specification GB-A-489 547 is illustrated by applying it to a load in the form of a drawing board or canvas that needs to be adjustable in height smoothly and with little effort. To this end the drawing board is at one side coupled with a first spring system having a substantially vertical orientation. The drawing board is further coupled with a zigzag construction, tensioning substantially horizontally oriented springs that form the second spring system. The coupling of the first spring system and the second spring system with the drawing board, in connection with the zig-zag construction that forms the adjusting device, is designed such that the springs of the two spring systems, where they engage the drawing board, generate substantially self-compensating forces.

The apparatus known from the British patent specification GB-A-489 547 has several drawbacks. For example, the known apparatus prescribes the use of so-called zero-free-length springs, whose spring force is proportional to the total length of the spring. Such springs are relatively expensive compared with standard springs, whose spring force is proportional to the extension of the spring.

A further drawback of the apparatus known from the British patent specification GB-A-489 547 is that it takes up a rather large amount of space owing to the horizontally oriented springs requiring sufficient extension space.

The apparatus according to DE-A-34 06 669 is embodied with the first spring system having a linear spring characteristic and being coupled with the load, and having the second spring system coupled with the coupling at a side of the coupling remote from the load, and the coupling being designed for adjusting the second spring system subject to a predetermined spring characteristic of the second spring system such that, at the side of the load, the combination of the coupling with the second spring system possesses a force path diagram having a predetermined characteristic.

BRIEF SUMMARY OF THE INVENTION

It is the object of the invention to provide an alternative for the known apparatus, wherein the earlier-mentioned drawbacks are completely or partly removed and with which further advantages can be achieved, which will become apparent hereinafter.

To this end the apparatus according to the invention is characterized by one or several of the appended patent claims.

According to the invention the adjusting device is embodied with a parallelogram construction that comprises pivotally connected arms, with the load being coupled with a first hinge and the first spring system and/or the second spring system being coupled with a second hinge of the parallelogram construction, which second hinge is located opposite the first hinge without being adjacent thereto, and wherein the parallelogram construction comprises a third and fourth hinge opposite each other, each of which is adjacent to the first and the second hinge, and by designing the parallelogram construction such that it cooperates with the path defining organs so that during a load adjustment, the third and the fourth hinge are able to follow the predetermined paths.

As a result, the load is very lightly adjustable from any position. An important advantage of the invention is the possibility of saving a considerable amount of space, thereby enlarging the area of application of the apparatus according to the invention with, for example, completely new applications such as balancing kitchen cupboards and drawers in the vertical direction, and applications known from time immemorial like those shown, for example, in GB-A-4 89 547.

BRIEF DESCRIPTION OF THE SEVERAL VIEWS OF THE DRAWINGS

The drawing shows in.

Identical reference numerals used in the figures refer to similar components.

DETAILED DESCRIPTION OF THE INVENTION

Figure 1:
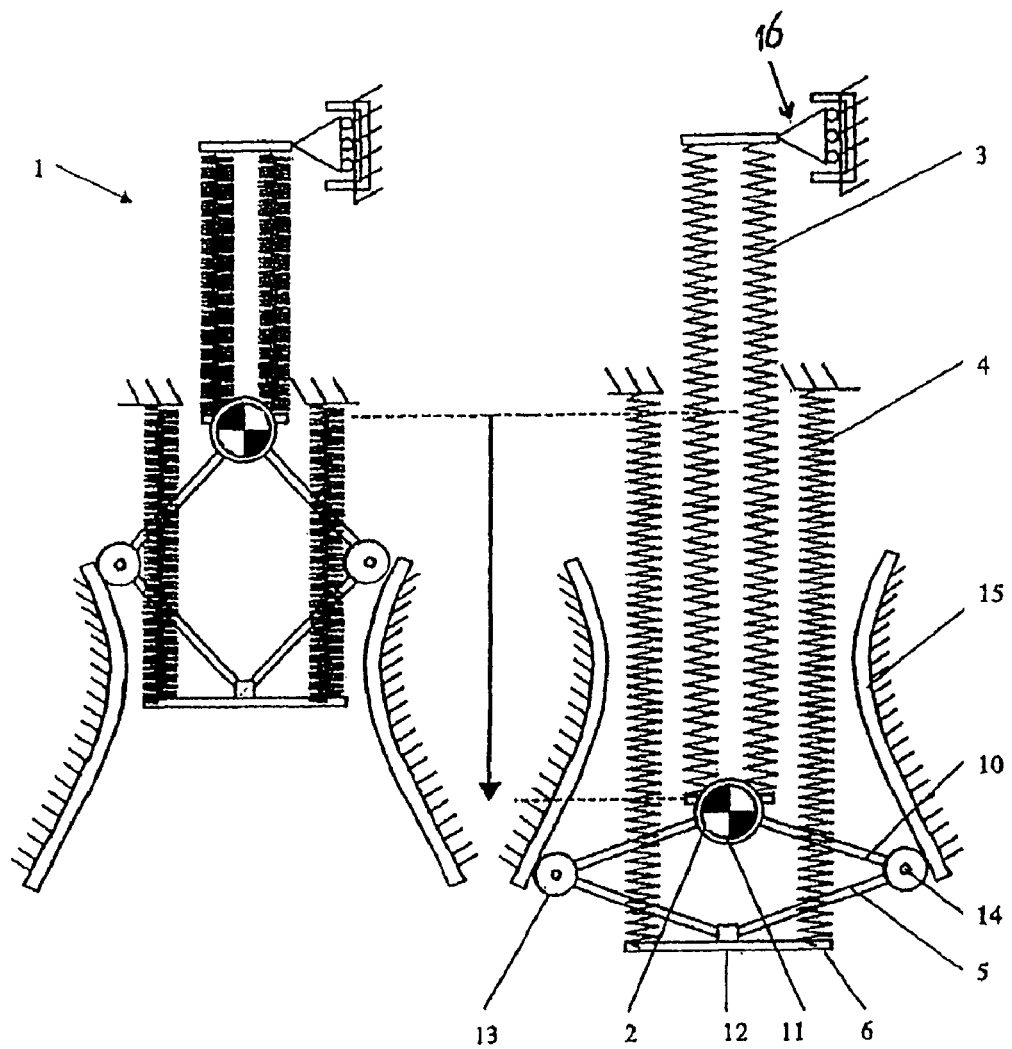
FIG. 1, a first schematic embodiment of the apparatus according to the invention.

With respect to design, it may be advantageous for a linear characteristic to be used for the predetermined characteristic of the force path diagram of the coupling in combination with the second spring system.

It is generally desirable to provide the apparatus with a lock, which may be activated before an adjustment is made to the load. After the load adjustment the lock may be released again.

An important advantage of the apparatus according to the invention is that the first spring system and the second spring system may comprise parallel oriented springs. It is owing to this aspect in particular that the invention provides such a substantial saving in space.

The advantage of this embodiment wherein a parallelogram construction is used as the adjusting device, is that standard springs can be used.

With all the possible embodiments of the apparatus according to the invention it is an advantage for the first spring system and/or the second spring system to be adjustable at a side facing away from the coupling with the adjusting device. By such an adjustment a weight increase or weight decrease of the load can easily be compensated, thereby meeting the important practical requirement of adjusting the balance when the weight of the load is adjusted. This is the case, for example, when removing objects from or placing them into a balanced kitchen cupboard.

The adjustment of the first spring system and/or the second spring system is particularly easy to realize if motorized.

The invention will now be further elucidated by way of the following explanation of some schematic exemplary embodiments, and with reference to the drawing. As this concerns schematic exemplary embodiments, it will be obvious that they must not be understood as limitation to the appended claims, but rather that these examples merely serve as explanation of the appended claims without limiting the essence of the invention to these examples. The protective scope due the invention is determined exclusively by the appended claims.

Reference numeral 1 in the figures generally refers to the apparatus according to the invention. This apparatus 1 comprises a load 2 and further a first spring system 3 and a second spring system 4.

Both spring systems 3, 4 are coupled directly or indirectly with the load 2. In the case of the first spring system 3 this coupling is direct, while in the case of the second system 4 it is indirect via an adjusting device 5.

The two spring systems 3, 4 engage the load 2 in such a way that at the load 2, they produce substantially compensatory forces, with the result that the load 2 can be moved relatively lightly.

Figure 2:
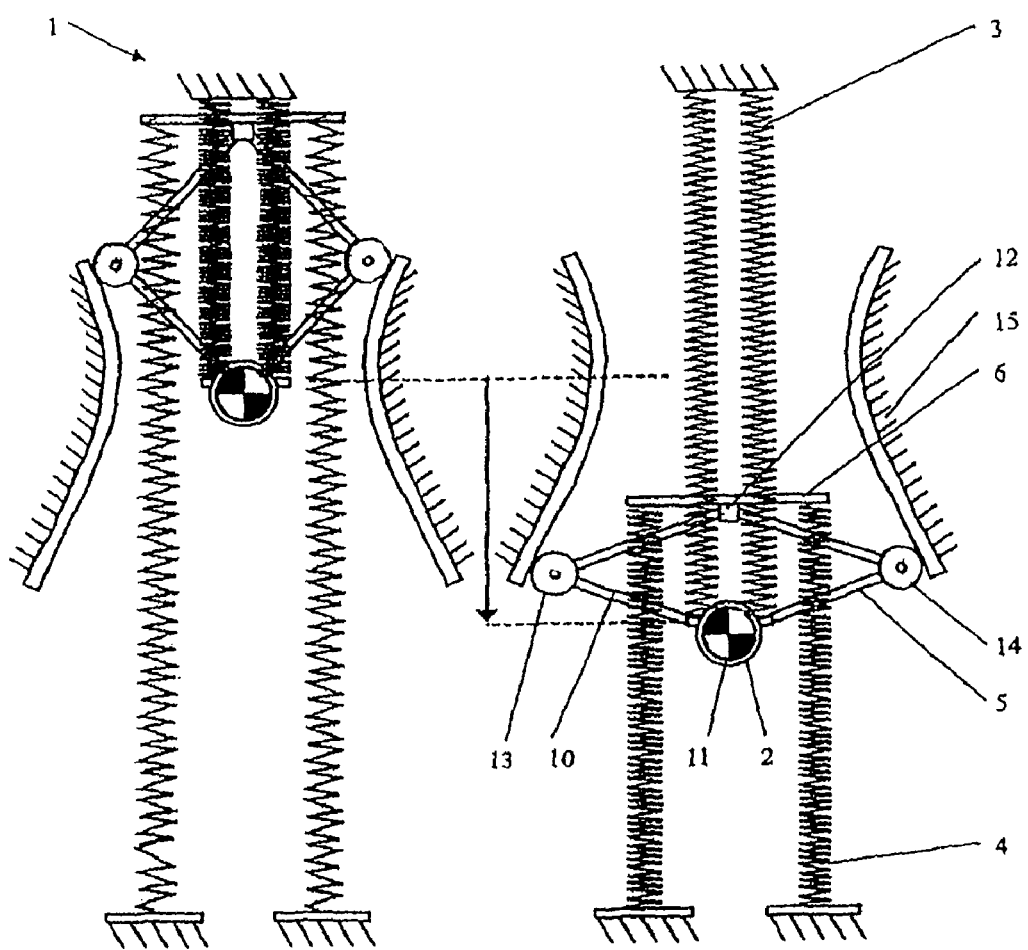
FIG. 2, a second schematic embodiment of the apparatus according to the invention.

In order to facilitate the light movement of the load 2, the load 2 is coupled with an adjusting device 5, already referred to above. This adjusting device 5 is provided with a coupling 6 by which the second spring system 4 is coupled with the adjusting device 5, as shown in FIGS. 1 and 2. The adjusting device 5 is designed such that the position of the coupling 6 changes subject to a movement of the load 2.

For all the embodiments shown in FIG. 1 and FIG. 2 applies that the first spring system 3 and the second spring system 4 comprise parallel oriented springs. It is, however, also possible to give the first spring system 3 a different orientation to that of the second spring system 4. In accordance with the invention, the adjusting device 5 is in the illustrated cases designed such that the movement of the coupling 6 at the side of the second spring system 4 occurs substantially in a direction corresponding to the direction of movement of the load 2. However, this is also no prerequisite. It is of importance for the apparatus to be designed such that the first spring system 3 possesses a linear spring characteristic and that the direction and degree of movement of the coupling 6 occurs at the side of the second spring system 4, subject to a predetermined spring characteristic of the second spring system 4, in such a way that, viewed from the side of the load 2, the combination of the coupling 6 with the second spring system 4 possesses a force path diagram having a predetermined characteristic. This is preferably a linear characteristic.

In the embodiments of FIGS. 1 and 2, the apparatus is shown in a version where the two spring systems 3, 4 may be embodied as co-working springs (FIG. 1) or antagonistic springs (FIG. 2).

Both embodiments of FIGS. 1 and 2 show an adjusting device 5, comprising a parallelogram construction 10, formed by pivotally coupled arms. The load 2 is coupled with a first hinge 11, while in the illustrated case the second spring system 4 is coupled with a second hinge 12 of this parallelogram construction 10, which hinge is located opposite the first hinge 11 without being adjacent thereto.

In both the embodiments shown in FIGS. 1 and 2 the parallelogram construction 10 is also provided with opposite third and fourth hinges 13, 14, each adjacent to the first and the second hinge 11, 12. It is of importance for the third hinge 13 and the fourth hinge 14 to cooperate with path defining organs 15 such as to, during a movement of the load 2, allow the third hinge 13 and the fourth hinge 14 to continue on predetermined paths. This achieves that during a movement of the load 2, the springs of the first spring system 3 and of the second spring system 4 will continue their spring characteristic in a predetermined manner, so as to obtain an adequate compensation of the forces of these springs at the load 2. By way of explanation, both FIG. 1 and FIG. 2 show at the left of the figure the load in a relatively high position, and at the right of the figure, the load 2 in a relatively low position. The corresponding position of the first spring system 3 and the second spring system 4 are also shown clearly in the figures, while it is immediately apparent to the person skilled in the art how, when the load 2 undergoes the movement, the parallelogram construction 5 works together with the path defining organs 15.

It is remarked, perhaps unnecessarily, that the first spring system 3 and/or the second spring system 4 may be adjustable at a side facing away from the coupling with the adjusting device 5. This facilitates an adjustment of the compensatory forces at the load 2, making it simple to compensate a weight adjustment of the load 2. By way of example, this is shown schematically in FIG. 1 by the fact that, at the side facing away from the load 2, the first spring system 3 is linked to stationary object via a movable carriage 16. Advantageously the movement of the carriage 16 of the first spring system 3 (or as the case may be, the second spring system 4) is motorized while in addition, a measuring and control system may be provided to automize this adjustment.

What is claimed is:

1. An apparatus for exerting a force on a load, comprising at least a first spring system with a linear spring characteristic and a second spring system, which two spring systems are coupled with said load and produce forces that are applied to the load, wherein an adjusting device is provided coupled with the load, which is equipped with at least one coupling with which the first spring system and the second spring system are coupled, and which adjusting device is designed for moving the coupling subject to an adjustment of the load, wherein the second spring system is coupled with the coupling at a side of the coupling remote from the load, and the coupling is designed for adjusting the second spring system subject to a predetermined spring characteristic of the second spring system such that, at the side of the load, the combination of the coupling with the second spring system possesses a force path diagram having a predetermined characteristic, wherein the adjusting device comprises a parallelogram construction of pivotally connected arms, with said load being coupled with a first hinge, and the second spring system being coupled with a second hinge of the parallelogram construction, which second hinge is located opposite the first hinge without being adjacent thereto, and wherein the parallelogram construction comprises a third and fourth hinge opposite each other, each of which is adjacent to the first and second hinge, and wherein the third hinge and the second hinge of the parallelogram construction cooperate with path defining organs so that during a load adjustment, the third and the fourth hinges are able to follow predetermined paths.

2. An apparatus according to claim 1, wherein the predetermined characteristic of the force path diagram is a linear characteristic.

3. An apparatus according to claim 1, wherein the first spring system and the second spring system comprise parallel oriented springs.

4. An apparatus according to claim 1, wherein the first spring system and/or the second spring system is/are adjustable at a side facing away from the coupling with the adjusting device.

5. An apparatus according to claim 4, wherein the adjustment of the first spring system and/or the second spring system is motorized.

* * * * *